US009163117B2

(12) United States Patent
Mitadera et al.

(10) Patent No.: US 9,163,117 B2
(45) Date of Patent: Oct. 20, 2015

(54) POLYAMIDE RESIN

(75) Inventors: Jun Mitadera, Kanagawa (JP); Masashi Kurokawa, Kanagawa (JP); Shigeyuki Hirose, Kanagawa (JP); Nobuhiko Matsumoto, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/698,292

(22) PCT Filed: Jul. 21, 2011

(86) PCT No.: PCT/JP2011/066549
§ 371 (c)(1),
(2), (4) Date: Nov. 16, 2012

(87) PCT Pub. No.: WO2012/014772
PCT Pub. Date: Feb. 2, 2012

(65) Prior Publication Data
US 2013/0066041 A1    Mar. 14, 2013

(30) Foreign Application Priority Data

Jul. 27, 2010  (JP) .................. 2010-168287
May 27, 2011  (JP) .................. 2011-119107
May 27, 2011  (JP) .................. 2011-119113

(51) Int. Cl.
 C08G 69/28    (2006.01)
 C08G 69/26    (2006.01)
 C08L 77/06    (2006.01)
(52) U.S. Cl.
 CPC .............. *C08G 69/265* (2013.01); *C08G 69/26* (2013.01); *C08L 77/06* (2013.01)
(58) Field of Classification Search
 USPC ............... 524/414; 528/310, 329.1, 332, 347, 528/352, 360, 364, 373, 358
 See application file for complete search history.

(56) References Cited

U.S. PATENT DOCUMENTS

| 3,904,705 | A  |   | 9/1975  | White |           |
|-----------|----|---|---------|----------------|----------|
| 4,822,846 | A  | * | 4/1989  | Nomura et al.  | 524/538  |
| 2003/0114591 | A1 |   | 6/2003 | Sato et al.    |          |
| 2008/0039568 | A1 | * | 2/2008 | Maruyama et al.| 524/414  |
| 2010/0105812 | A1 |   | 4/2010 | Bussi et al.   |          |
| 2012/0289643 | A1 | * | 11/2012| Kanda et al.   | 524/451  |
| 2013/0066041 | A1 |   | 3/2013 | Mitadera et al.|          |

FOREIGN PATENT DOCUMENTS

| CN | 1422296 A | 6/2003 |
|----|-----------|--------|
| CN | 1237117 C | 1/2006 |
| EP | 2 436 733 A1 | 4/2012 |
| EP | 2 505 597 | 10/2012 |
| JP | 2001-329169 | 11/2001 |
| JP | 2001 329169 | 11/2001 |
| JP | 2003-201399 | 7/2003 |
| JP | 2003 201399 | 7/2003 |
| JP | 2007-31475 | 2/2007 |
| JP | 2008-056842 | 3/2008 |
| JP | 2009 74082 | 4/2009 |
| JP | 2009-74082 | 4/2009 |
| JP | 2010 7056 | 1/2010 |
| JP | 2010 70638 | 4/2010 |
| JP | 2010 121113 | 6/2010 |
| JP | 2010 519350 | 6/2010 |
| JP | 2010-253803 | 11/2010 |
| JP | 2010 253803 | 11/2010 |
| WO | 94/19394 | 9/1994 |
| WO | 2006/108721 | 10/2006 |
| WO | 2009 101320 | 8/2009 |
| WO | WO 2010/058140 A1 | 5/2010 |
| WO | WO 2011/065347 * | 6/2011 |

OTHER PUBLICATIONS

Chempech (published on Web on Feb. 2006).*
U.S. Appl. No. 13/809,499, filed Jan. 10, 2013, Mitadera, et al.
International Search Report and Written Opinion of the International Searching Authority issued Oct. 11, 2011, in PCT/JP2011/066549, filed Jul. 21, 2011 (with English Translation of Category of Cited Documents, English translation of the International Search Report previously filed Nov. 16, 2012).
Japanese Office Action Issued Feb. 28, 2012 in JP Patent Application No. 2012-501043 (with English translation).
Japanese Office Action Issued Jul. 24, 2012 in JP Patent Application No. 2012-501043 (with English translation).
International Search Report Issued Oct. 11, 2011 in PCT/JP11/066549 Filed Jul. 21, 2011.
U.S. Appl. No. 13/885,444, filed May 15, 2013, Mitadera.
U.S. Appl. No. 13/824,027, filed Mar. 15, 2013, Mitadera, et al.
U.S. Appl. No. 13/822,152, filed Mar. 11, 2013, Mitadera, et al.
Combined Office Action and Search Report issued Jul. 3, 2013 in Chinese Patent Application No. 201180027230.1 with English language translation and English translation of categories of cited documents.
International Preliminary Report on Patentability and Written Opinion issued on Mar. 21, 2013 in PCT/JP2011/066549 (with English Translation).

(Continued)

*Primary Examiner* — Gregory Listvoyb
(74) *Attorney, Agent, or Firm* — Oblon, McClelland, Maier & Neustadt, L.L.P.

(57) ABSTRACT

Provided is a polyamide resin having excellent color tone and elastic modulus, excellent gas barrier properties and low water absorption. The polyamide resin comprises a diamine structural unit and a dicarboxylic acid structural unit, wherein 70 mol % or more of the diamine structural unit is derived from xylylenediamine (A-1) and/or bis(aminomethyl)cyclohexane (A-2) and 50 mol % or more of the dicarboxylic acid structural unit is derived from sebacic acid (B), characterized in that it has a sulfur atom concentration of 1 to 200 ppm by mass.

15 Claims, No Drawings

(56) References Cited

OTHER PUBLICATIONS

Office Action issued Dec. 13, 2013 in Australian Patent Application No. 2011283795.

Extended European Search Report issued Jan. 27, 2014, in European Patent Application No. 11812363.7

U.S. Appl. No. 14/528,063, filed Oct. 30, 2014.

U.S. Appl. No. 13/698,292, filed Nov. 16, 2012.

EP Communication pursuant to Article 94(3) EPC issued Jul. 28, 2015 in European Patent Application No. 11 812 363.7 filed Jul. 21, 2011.

* cited by examiner

POLYAMIDE RESIN

TECHNICAL FIELD

The present invention relates to polyamide resin compositions, specifically polyamide resins having excellent color tone and elastic modulus as well as excellent gas barrier properties and low water absorption.

BACKGROUND ART

Polyamide resins are widely used as engineering plastics having excellent mechanical strength such as impact resistance and friction/abrasion resistance as well as excellent heat resistance and oil resistance in the fields of automotive parts, electronic/electric equipment parts, office automation equipment parts, machine parts, construction materials/housing parts and the like, and recently have found increasingly wide application.

Many classes of polyamides including e.g., polyamide 6 and polyamide 66 are known, among which m-xylylene adipamide (hereinafter sometimes referred to as "MXD6 polyamide") derived from m-xylylenediamine and adipic acid is positioned as a very excellent polyamide resin because it contains an aromatic ring in the main chain unlike polyamide 6 and polyamide 66 so that it has high rigidity, low water absorption and excellent oil resistance as well as a low shrinkage ratio during molding and causes little shrinkage or warp, which means that it is also suitable for precision molding. Thus, MXD6 polyamide has recently been more widely used as a molding material, especially extrusion molding material in various fields including parts of vehicles such as automobiles, general machine parts, precision machine parts, electronic/electric equipment parts, leisure/sports goods, civil engineering and construction materials, etc.

MXD6 polyamide has low water absorption as compared with other polyamide resins such as polyamide 66, but there is a need for molding materials having even lower water absorption to meet recent demanding requirements.

Lighter and stronger polyamide resin materials are also needed. A xylylene polyamide resin lighter than MXD6 polyamide and having lower water absorption includes a xylylene sebacamide resin derived from xylylenediamine and sebacic acid (hereinafter sometimes referred to as "XD10 polyamide").

However, polyamide resins containing xylylenediamine as a structural unit are more liable to yellowing than polyamide 6 and the like because they tend to generate radicals at the benzylmethylene sites for structural reasons. The applicant proposed a method for preventing yellowing of MXD6 polyamide by adding a phosphorus antioxidant and an alkaline component in the polyamide resin (patent document 1). An anti-yellowing effect can be achieved by this method, but this method was difficult to use for some applications because the addition of a phosphorus antioxidant enough to prevent yellowing may increase costs or a phosphorus compound may deposit on a filter or the like during extrusion molding of a film.

As alternative to polyamide resins containing a xylylenediamine-derived unit as a structural unit, polyamide resins derived from bis(aminomethyl)cyclohexane having no benzylmethylene site and a dicarboxylic acid (hereinafter sometimes referred to as "BAC polyamides") are expected to have high heat aging resistance. However, even BAC polyamides are not free from yellowing problems, and a polyamide resin derived from bis(aminomethyl)cyclohexane and sebacic acid (hereinafter sometimes referred to as "BAC 10 polyamide") recently remarked as a BAC polyamide having especially low water absorption also had problems in yellowing and heat aging resistance.

REFERENCES

Patent Documents

Patent document 1: JP-A 2007-31475

DISCLOSURE OF THE INVENTION

Problems to be Solved by the Invention

An object of the present invention is to solve the above problems and to provide yellowing-resistant XD10 polyamide or BAC10 polyamide resins.

Means for Solving the Problems

As a result of careful studies to obtain a yellowing-resistant XD10 or BAC10 polyamide resin, we accomplished the present invention on the basis of the surprising finding that an anti-yellowing effect can be achieved by controlling the amount of sulfur contained in a XD10 or BAC10 polyamide resin itself at a specific amount without relying on additives.

Thus, a first aspect of the present invention provides a polyamide resin comprising a diamine structural unit and a dicarboxylic acid structural unit, wherein 70 mol % or more of the diamine structural unit is derived from xylylenediamine (A-1) and/or bis(aminomethyl)cyclohexane (A-2) and 50 mol % or more of the dicarboxylic acid structural unit is derived from sebacic acid (B); and which has a sulfur atom concentration of 1 to 200 ppm by mass.

A second aspect of the present invention provides the polyamide resin according to the first aspect, which has a phosphorus atom concentration of 1 to 500 ppm by mass.

A third aspect of the present invention provides the polyamide resin according to the first or second aspect, which has a sodium atom concentration of 1 to 500 ppm by mass.

A fourth aspect of the present invention provides the polyamide resin according to the first aspect, wherein the xylylenediamine (A-1) is m-xylylenediamine, p-xylylenediamine or a mixture thereof.

A fifth aspect of the present invention provides the polyamide resin according to the first aspect, wherein the bis(aminomethyl)cyclohexane (A-2) is 1,4-bis(aminomethyl)cyclohexane, 1,3-bis(aminomethyl)cyclohexane or a mixture thereof.

A sixth aspect of the present invention provides the polyamide resin according to the first aspect, wherein the dicarboxylic acid structural unit is derived from sebacic acid (B).

A seventh aspect of the present invention provides the polyamide resin according to the first aspect, which has a number average molecular weight of 10,000 to 50,000.

A eighth aspect of the present invention provides the polyamide resin according to the first aspect, wherein the reaction molar ratio of the diamine component to the dicarboxylic acid component represented by the following equation (1) is 0.98-1.1;

$$r=(1-cN-b(C-N))/(1-cC+a(C-N)) \quad (1)$$

wherein $a=M_1/2$, $b=M_2/2$, $c=18.015$, wherein $M_1$ represents the molecular weight of the diamine component (g/mol), $M_2$ represents the molecular weight of the dicarboxylic acid component (g/mol), N represents the terminal amino group concentration (eq/g), and C represents the terminal carboxyl group concentration (eq/g).

A ninth aspect of the present invention provides a molded article formed by molding the polyamide resin according to any one of the first to eighth aspects.

Advantages of the Invention

Polyamide resins of the present invention have excellent color tone and elastic modulus, excellent gas barrier properties, low water absorption and high heat aging resistance.

Thus, polyamide resins of the present invention can be suitably used for a wide variety of moldings including various films, sheets, laminated films, laminated sheets, tubes, pipes, various containers such as hollow containers and bottles, various electric/electronic equipment parts and the like.

THE BEST MODE FOR CARRYING OUT THE INVENTION

[Polyamide Resins]

Polyamide resins of the present invention comprise a diamine structural unit and a dicarboxylic acid structural unit, wherein 70 mol % or more of the diamine structural unit is derived from xylylenediamine (A-1) and/or bis(aminomethyl)cyclohexane (A-2) and 50 mol % or more of the dicarboxylic acid structural unit is derived from sebacic acid (B); and which has a sulfur atom concentration of 1 to 200 ppm by mass.

As used hereinafter, "ppm" is defined to mean "ppm by mass".

Polyamide resins of the present invention have excellent color tone as proved by superior yellowness index (hereinafter sometimes referred to as "YI"), high elastic modulus, good gas barrier properties, low water absorption or excellent heat aging resistance by satisfying the criteria above.

The relation between the excellent color tone of polyamide resins of the present invention and such a sulfur content has not been sufficiently explained, but such excellent color tone is achieved by controlling the sulfur atom concentration at 1 to 200 ppm.

The diamine structural unit constituting the polyamide resins contains 70 mol % or more, preferably 80 mol % or more, more preferably 90 mol % or more of a unit derived from xylylenediamine (A-1) and/or bis(aminomethyl)cyclohexane (A-2). The unit derived from xylylenediamine (A-1) preferably has a unit derived from m-xylylenediamine, a unit derived from p-xylylenediamine or the both. The melting point or glass transition point, heat resistance and crystallization rate of the polyamide resins can be improved by combining a unit derived from m-xylylenediamine and a unit derived from p-xylylenediamine. The polyamide resins can exhibit excellent elastic modulus and gas barrier properties by containing 70 mol % or more of the unit derived from xylylenediamine in the unit derived from a diamine component.

For the purpose of improving crystallization rate of the polyamide resins, the unit derived from p-xylylenediamine in the unit derived from a diamine component is preferably 20 mol % or more, more preferably 40 mol % or more, even more preferably 60% or more.

For the purpose of improving flexibility of the polyamide resins, the unit derived from m-xylylenediamine in the unit derived from a diamine component is preferably 70 mol % or more, more preferably 80 mol % or more, even more preferably 90% or more.

The unit derived from bis(aminomethyl)cyclohexane (A-2) preferably has a unit derived from 1,4-bis(aminomethyl)cyclohexane, a unit derived from 1,3-bis(aminomethyl)cyclohexane or the both. The unit derived from bis(aminomethyl)cyclohexane is 70 mol % or more, preferably 80 mol % or more, more preferably 90 mol % or more. The polyamide resins can exhibit excellent elastic modulus and gas barrier properties, high glass transition temperature as well as heat aging resistance by containing 70 mol % or more of the unit derived from bis(aminomethyl)cyclohexane in the diamine unit.

Crystallinity or melting point can be regulated as appropriate by controlling the ratio between the unit derived from 1,4-bis(aminomethyl)cyclohexane and the unit derived from 1,3-bis(aminomethyl)cyclohexane when the both are present. 1,4-Bis(aminomethyl)cyclohexane includes cis-1,4-bis(aminomethyl)cyclohexane and trans-1,4-bis(aminomethyl)cyclohexane as isomers, and 1,3-bis(aminomethyl)cyclohexane also includes cis-1,3-bis(aminomethyl)cyclohexane and trans-1,3-bis(aminomethyl)cyclohexane as isomers, and the crystallinity of the polyamide resins can be conveniently adjusted by changing the cis/trans molar ratio in the unit derived from bis(aminomethyl)cyclohexane. A preferred isomer molar ratio depends on the purpose of application of the molding of a polyamide resin, i.e., depends on whether it is used for applications requiring high crystallinity or applications requiring low-crystallinity or non-crystallinity.

A preferred isomer molar ratio of 1,4-bis(aminomethyl)cyclohexane (A) depends on the purpose of application of the molding of a polyamide resin, i.e., depends on whether it is used for applications requiring high crystallinity or applications requiring low-crystallinity or non-crystallinity. For use in applications requiring high crystallinity, a preferred (cis/trans) isomer molar ratio is 50/50 to 0/100 mol %, preferably 40/60 to 0/100 mol %, more preferably 30/70 to 0/100 mol % Polyamide resins using 1,4-bis(aminomethyl)cyclohexane including 50 mol % or more of its trans-isomer are useful as resins for molding materials having not only high strength and high elastic modulus but also excellent rigidity retention at high temperatures, durability at high temperatures and mechanical performance retention when absorbing water because the resins have high crystallization rate enough to provide moldings sufficiently solidified and crystallized in dies.

For use in applications requiring low-crystallinity or non-crystallinity on the other hand, a preferred (cis/trans) isomer molar ratio is 100/0 to 50/50 mol %, preferably 100/0 to 60/40 mol %, more preferably 100/0 to 70/30 mol %. Polyamide resins which can be obtained by using 1,4-bis(aminomethyl)cyclohexane including 50 mol % or less of its trans-isomer has low-crystallization rate, resulting in the polyamide resins without bleaching and with high transparency even when they absorb water.

A preferred isomer molar ratio of 1,3-bis(aminomethyl)cyclohexane (A) depends on the purpose of application of the molding of a polyamide resin, i.e., depends on whether it is used for applications requiring high crystallinity or applications requiring low-crystallinity or non-crystallinity. For use in applications requiring high crystallinity, a preferred (cis/trans) isomer molar ratio is 100/0 to 90/10 mol %, preferably 100/0 to 93/7 mol %, more preferably 100/0 to 95/5 mol %. Polyamide resins using 1,3-bis(aminomethyl)cyclohexane including 90 mol % or more of its cis-isomer are useful as resins for molding materials having not only high strength and high elastic modulus but also excellent rigidity retention at high temperatures, durability at high temperatures and mechanical performance retention when absorbing water because they have high crystallization rate enough to provide moldings sufficiently solidified and crystallized in dies.

For use in applications requiring low-crystallinity or non-crystallinity on the other hand, a preferred (cis/trans) isomer molar ratio is 0/100 to 90/10 mol %, preferably 0/100 to 80/20 mol %, more preferably 0/100 to 70/30 mol %. Polyamide resins which can be obtained by using 1,3-bis(aminomethyl)cyclohexane including 10 mol % or less of its trans-isomer has low-crystallization rate, resulting in the polyamide resins without bleaching and with high transparency even when they absorb water.

When the unit derived from a diamine component has both of the unit derived from xylylenediamine (A-1) and the unit derived from bis(aminomethyl)cyclohexane (A-2), the total of the both units is preferably 70 mol % or more.

Examples of units that can constitute diamine-derived units other than xylylenediamine (A-1) and bis(aminomethyl)cyclohexane (A-2) may include, but not limited to, units derived from aliphatic diamines such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-diaminocyclohexane, 1,4-diaminocyclohexane, bis(4-aminocyclohexyl)methane, 2,2-bis(4-aminocyclohexyl)propane, bis(aminomethyl) decane and bis(aminomethyl)tricyclodecane; diamines having an aromatic ring such as bis(4-aminophenyl)ether, p-phenylenediamine and bis(aminomethyl)) naphthalene, etc.

On the other hand, 50 mol % or more of the dicarboxylic acid structural unit constituting polyamide resins of the present invention must be a unit derived from sebacic acid (B). If the amount of the unit derived from sebacic acid (B) is less than 50 mol % of the structural unit derived from a dicarboxylic acid, the polyamide resins have high moisture content, high water absorption (hygroscopy) and high density and tend to deteriorate in heat aging resistance. Higher amounts of the unit derived from sebacic acid allow weight reduction. The amount of the unit derived from sebacic acid is preferably 60 to 100 mol %, more preferably 70 to 100 mol %.

Structural units derived from dicarboxylic acids other than sebacic acid (B) in the polyamide resins preferably include units derived from dicarboxylic acids based on other straight chain aliphatic α,ω-dicarboxylic acids containing 4 to 20 carbon atoms, e.g., units derived from aliphatic dicarboxylic acids such as adipic acid, succinic acid, glutaric acid, pimelic acid, suberic acid, azelaic acid, undecanoic diacid, dodecanoic diacid, etc. Among them, units derived from dicarboxylic acids other than sebacic acid are preferably units derived from adipic acid, undecanoic diacid, dodecanoic diacid and the like, if they are present. Among them, an especially preferred unit derived from a dicarboxylic acid includes a unit derived from adipic acid. Suitable elastic modulus, water absorption and crystallinity can be achieved by additionally including a unit derived from adipic acid. The amount of the unit derived from adipic acid is more preferably 40 mol % or less, even more preferably 30 mol % or less. Polyamide resins additionally containing a unit derived from undecanoic diacid or dodecanoic diacid are also preferred because they have lower specific gravity and the resulting moldings have lower weight. The proportion of a unit derived from a straight chain aliphatic α,ω-dicarboxylic acid containing 4 to 20 carbon atoms other than sebacic acid is less than 50 mol %, preferably 40 mol % or less, if such a unit is present.

Units derived from aromatic dicarboxylic acids such as terephthalic acid, isophthalic acid and 2,6-naphthalenedicarboxylic acid may also be contained, and a plurality of these units may be contained.

In addition to the unit derived from a diamine component and the unit derived from a dicarboxylic acid component, units derived from lactams such as ε-caprolactam and laurolactam or aliphatic aminocarboxylic acids such as aminocaproic acid and aminoundecanoic acid may also be contained as polymer units constituting the polyamide resins so far as the benefits of the present invention are not affected.

The sulfur atom concentration of the polyamide resins is 1 to 200 ppm, more preferably 10 to 150 ppm, especially preferably 20 to 100 ppm. When it is in the ranges above, not only the increase in YI of the polyamide resins during preparation but also the increase in YI during melt molding of the polyamide resins can be reduced so that the YI of the resulting moldings can be decreased.

The amount of phosphorus inevitably existing in the polyamide resins in their industrial preparation as described later is preferably 1 to 500 ppm, more preferably 5 to 300 ppm, even more preferably 10 to 200 ppm expressed as the phosphorus atom concentration. If the phosphorus atom concentration is less than 1 ppm, the polyamide resins are liable to yellowing, and if it exceeds 500 ppm, it may be difficult to control polymerization due to excessive amidation reaction during the synthesis of the polyamide resins as described later.

The amount of sodium compounds typically existing in polyamide resins in their industrial preparation as described later is preferably 1 to 500 ppm, more preferably 5 to 300 ppm, even more preferably 10 to 200 ppm expressed as the sodium atom concentration.

The ratio (P/Na) between the phosphorus atom concentration (P) and the sodium atom concentration (Na) in the polyamide resins is preferably 0.4 to 0.9, more preferably 0.4 to 0.8, even more preferably 0.4 to 0.7. When it is in the ranges above, the polymerization degree or molecular weight can be readily controlled because amidation reaction during the synthesis of the polyamide resins proceeds at appropriate speed. Further, the increase in YI can be reduced when the polyamide resins are molded.

The number average molecular weight of the polyamide resins is preferably 8,000 to 50,000, more preferably 12,000 to 45,000, even more preferably 15,000 to 40,000, especially 20,000 to 38,000. When it is in such ranges, flowability is good so that moldability is good during preparation of various moldings. If it is more than 50,000, the YI of the polyamide resins may increase because excessive thermal history must be applied during the synthesis of the polyamide resins. When it is in the ranges above, the flowability of the resins is good during molding processes so that retention in the apparatus can be reduced and the resulting moldings may have better quality with little inclusions such as char.

The number average molecular weight of a polyamide resin is calculated by the equation (2) below:

$$\text{Number average molecular weight} = 2 \times 1,000,000/([\text{COOH}]+[\text{NH}_2]) \quad (2)$$

wherein [COOH] represents the terminal carboxyl group concentration in the polyamide resin (μeq/g), and [NH$_2$] represents the terminal amino group concentration in the polyamide resin (μeq/g).

As used herein, the terminal amino group concentration refers to the value calculated from neutralization titrations of a solution of a polyamide resin dissolved in a phenol/ethanol mixed solution with a dilute aqueous hydrochloric acid solution, and the terminal carboxyl group concentration refers to the value calculated from neutralization titrations of a solution of a polyamide resin dissolved in benzyl alcohol with an aqueous sodium hydroxide solution or a potassium hydroxide/benzyl alcohol solution.

The melting point of the polyamide resins should preferably be controlled in the range of 150° C. to 320° C., more preferably 160 to 310° C., even more preferably 170 to 300° C., especially preferably 180 to 295° C., most preferably 180 to 290° C. The melting point is preferably in the ranges above because processability tends to improve.

The glass transition temperature of the polyamide resins is preferably in the range of 50 to 130° C. The glass transition point is preferably in the range above because barrier properties tend to improve.

As used herein, the melting point and glass transition of a polyamide resin refer to the melting point and glass transition that can be determined by differential scanning calorimetry (DSC) by melting a sample by heating it once to eliminate the influence of thermal history on crystallinity and then heating it again. Specifically, a sample is heated at a rate of 10° C./min from 30° C. to a temperature equal to or higher than an expected melting point, and held at that temperature for 2 min and then cooled at a rate of 20° C./min to 30° C. Then, the sample is heated at a rate of 10° C./min to a temperature equal to or higher than the melting point, whereby the melting point and the glass transition point can be determined.

The polyamide resins preferably have a terminal amino group concentration of less than 100 µeq/g, more preferably 5 to 75 µeq/g, even more preferably 10 to 50 µeq/g, and a terminal carboxyl group concentration of less than 100 µeq/g, more preferably 10 to 90 µeq/g, even more preferably 10 to 50 µeq/g. Those having a terminal amino group concentration and a terminal carboxyl group concentration in the ranges above tend to show stable viscosity during molding and improved processability.

The polyamide resins preferably have a molar ratio of the diamine component to the dicarboxylic acid component reacted (the number of moles of the reacted diamine component/the number of moles of the reacted dicarboxylic acid component) of 0.98 to 1.1, more preferably 0.985 to 1, even more preferably 0.99 to 0.999. Reaction molar ratios outside the range of 0.98 to 1.1 are not preferred because the number average molecular weight of the polyamide resins is less likely to increase. Reaction molar ratios more than 1.1 are not preferred, either, because the polyamide resins have excessive terminal amino groups, inviting a tendency to increase the haze of the resulting moldings or to increase the possibility of producing gelled materials.

The reaction molar ratio (r) here is determined by the equation below:

$$r = (1 - cN - b(C-N))/(1 - cC + a(C-N))$$

wherein a: $M_1/2$
b: $M_2/2$
c: 18.015
$M_1$: the molecular weight of the diamine component (g/mol)
$M_2$: the molecular weight of the dicarboxylic acid component (g/mol)
N: terminal amino group concentration (eq/g)
C: terminal carboxyl group concentration (eq/g).

The polyamide resins preferably have a relative viscosity of 1.7 to 4.7, more preferably 2.05 to 4.3, even more preferably 2.45 to 3.9 as determined at a resin concentration of 1 g/100 cc in 96% sulfuric acid at a temperature of 25° C. Such ranges are preferred because moldability tends to improve.

The moisture content of the polyamide resins is preferably 0.005 to 0.8% by mass, more preferably 0.01 to 0.6% by mass, even more preferably 0.02 to 0.5% by mass. If the moisture content is in the ranges above, polyamide resin compositions having stable quality can be easily prepared because molecular weight loss can be reduced when they are prepared by melt-kneading the polyamide resins with additive components as appropriate, for example. When the polyamide resins have been prepared by solid-phase polymerization, a preferred moisture content is preferably 0.005 to 0.2% by mass, more preferably 0.01 to 0.1% by mass, even more preferably 0.02 to 0.08% by mass. If it is in the ranges above, the polyamide resins can be stably molded into films, tubes, bottles or the like without increasing or decreasing viscosity. Moreover, the resulting moldings also tend to have good appearance because the product appearance is not damaged due to bubbles or the like during molding.

The process for preparing polyamide resins of the present invention is not specifically limited, but can be performed using any method and polymerization conditions. For example, the polyamide resins can be prepared by heating a nylon salt consisting of a diamine component (e.g., m-xylylenediamine, bis(aminomethyl)cyclohexane) and a dicarboxylic acid component (e.g., sebacic acid) under pressure in the presence of water to polymerize it in a melt state while removing the added water and condensed water.

The polyamide resins can also be prepared by directly adding a diamine component (m-xylylenediamine, bis(aminomethyl)cyclohexane, etc.) to a dicarboxylic acid component (sebacic acid, etc.) in a melt state and polycondensing them at atmospheric or high pressure. In the latter case, polycondensation proceeds by continuously adding the diamine component to the dicarboxylic acid component while heating the reaction system to a reaction temperature not lower than the melting points of the oligoamide and polyamide produced to maintain the reaction system in a homogeneous liquid state.

During polycondensation of the polyamide resins, a small amount of a monoamine or monocarboxylic acid may be added as a molecular weight modifier.

The polyamide resins may also be polycondensed by solid-phase polymerization after they are prepared by melt polymerization. Solid-phase polymerization is not specifically limited, but can be performed using any method and polymerization conditions.

Sebacic acid (B) here preferably has a sulfur atom concentration of 1 to 200 ppm, more preferably 10 to 150 ppm, especially preferably 20 to 100 ppm. When it is in the ranges above, the increase in YI can be reduced during the synthesis of the polyamide resins. The increase in YI during melt molding of the polyamide resins can also be reduced so that the YI of the resulting moldings can be decreased.

Moreover, sebacic acid (B) preferably has a sodium atom concentration of 1 to 500 ppm, more preferably 10 to 300 ppm, especially preferably 20 to 200 ppm. When it is in the ranges above, the polyamide resins are synthesized with good reactivity and readily controlled in an appropriate molecular weight range and the amount of alkali metal compounds used for controlling the amidation reaction speed described later can be reduced. Moreover, the increase in viscosity during melt molding of the polyamide resins can be reduced so that moldability improves and char can be prevented during molding, whereby the resulting moldings tend to have good quality. Additionally, the polyamide resins tend to be less likely deposited as degraded resins on a die when they are compounded with glass fillers or the like.

Such sebacic acid (B) is preferably derived from a plant. Polyamide resins containing a unit derived from sebacic acid (B) of plant origin as a structural unit have low YI without adding any antioxidant and the resulting moldings also have low YI because plant-derived sebacic acid contains impurities such as sulfur compounds and sodium compounds. Plant-derived sebacic acid (B) is preferably used without excessively purifying impurities. The elimination of the necessity of excessive purification is also advantageous in terms of cost.

The purity of plant-derived sebacic acid (B) is preferably 99 to 100% by mass, more preferably 99.5 to 100% by mass, even more preferably 99.6 to 100% by mass. These ranges are preferred, because the resulting polyamide resins have good quality and polymerization is not affected.

For example, the amount of dicarboxylic acids such as 1,10-decamethylenedicarboxylic acid contained in sebacic acid (B) is preferably 0 to 1% by mass, more preferably 0 to 0.7% by mass, even more preferably 0 to 0.6% by mass. These ranges are preferred, because the resulting polyamide resins have good quality and polymerization is not affected.

The amount of monocarboxylic acids such as octanoic acid, nonanoic acid and undecanoic acid contained in sebacic acid (B) is preferably 0 to 1% by mass, more preferably 0 to 0.5% by mass, even more preferably 0 to 0.4% by mass. These ranges are preferred, because the resulting polyamide resins have good quality and polymerization is not affected.

Hue (APHA) of sebacic acid (B) is preferably 100 or less, more preferably 75 or less, even more preferably 50 or less. These ranges are preferred, because the resulting polyamide resins have low YI. As used herein, APHA can be determined by Standard Methods for the Analysis of Fats, Oils and Related Materials defined by Japan Oil Chemist's Society.

During the preparation of the polyamide resins, hypophosphite compounds (also known as phosphinate compounds or phosphonite compounds) or phosphite compounds (also known as phosphonate compounds) or the like are typically added as antioxidants (heat stabilizers) at the stage of polycondensation in a melt state or the stage of preparation of starting materials (aqueous nylon salt solutions) for the purpose of improving processing stability during melt molding and preventing discoloration of the polyamide resins or catalyzing amidation reaction. These phosphate antioxidants are oxidized into phosphorous acid salts or phosphoric acid salts so that oxygen is removed from the polyamide resin being polycondensed, thereby preventing oxidative degradation of polyamide molecules.

The amount of phosphorus thus inevitably existing in polyamide resins of the present invention in their industrial preparation is preferably 1 to 500 ppm, more preferably 5 to 300 ppm, even more preferably 10 to 200 ppm expressed as the phosphorus atom concentration, as described above. If the phosphorus atom concentration is less than 1 ppm, the polyamide resins are liable to yellowing, and if it exceeds 500 ppm, it may be difficult to control polymerization due to excessive amidation reaction during the synthesis of the polyamide resins.

Specific examples of hypophosphite compounds as antioxidants include hypophosphorous acid; metal salts of hypophosphorous acid such as sodium hypophosphite, potassium hypophosphite and lithium hypophosphite; hypophosphite compounds such as ethyl hypophosphite, dimethylphosphinic acid, phenylmethylphosphinic acid, phenylphosphonous acid and ethyl phenylphosphonite; metal salts of phenylphosphonous acid such as sodiumphenylphosphonite, potassiumphenylphosphonite and lithium phenylphosphonite, etc.

Specific examples of phosphite compounds include phosphorous acid, pyrophosphorous acid; metal salts of phosphorous acid such as sodium hydrogenphosphite and sodium phosphite; phosphite compounds such as triethyl phosphite, triphenyl phosphite, ethylphosphonic acid, phenylphosphonic acid and diethyl phenylphosphonate; metal salts of phenylphosphonic acid such as sodium ethylphosphonate, potassium ethylphosphonate, sodium phenylphosphonate, potassium phenylphosphonate and lithium phenylphosphonate, etc.

Among them, preferred antioxidants are metal salts of hypophosphorous acid such as sodium hypophosphite, potassium hypophosphite and lithium hypophosphite, especially sodium hypophosphite in view of the effect of promoting polymerization reaction of the polyamide resins and the effect of preventing discoloration.

Polycondensation of the polyamide resins may be performed in the presence of a phosphorus-containing compound, as described above. However, if the phosphorus-containing compound is excessively used, amidation reaction speed is so promoted that polymerization becomes difficult to control and char may be produced during molding of the polyamide resins.

Thus, an alkali metal compound is often used at the same time in order to control the amidation reaction speed. The alkali metal compound is used in such an amount that the number of moles of the alkali metal compound divided by the number of moles of the phosphorus-containing compound is typically in the range of 0.5 to 1, preferably 0.55 to 0.95, even more preferably 0.6 to 0.9. When the amount is in the ranges above, polycondensation takes place at appropriate speed and polyamide resins having low YI and excellent quality can be obtained.

Alkali metal compounds typically used are alkali metal hydroxides and alkali metal acetates, preferably sodium hydroxide and sodium acetate.

The amount of sodium compounds thus inevitably existing in polyamide resins of the present invention in their industrial preparation is preferably 1 to 500 ppm, more preferably 5 to 300 ppm, even more preferably 10 to 200 ppm expressed as the sodium atom concentration, as described above. Sodium compounds may be derived from sebacic acid (B) or both of sebacic acid (B) and the alkali metal compounds described above.

The ratio (P/Na) between the phosphorus atom concentration (P) and the sodium atom concentration (Na) in the polyamide resins is preferably 0.4 to 0.9, more preferably 0.4 to 0.8, even more preferably 0.4 to 0.7, as described above. When it is in the ranges above, the polymerization degree or molecular weight can be readily controlled because amidation reaction during the synthesis of the polyamide resins proceeds at appropriate speed. Further, the increase in YI can be reduced when the polyamide resins are molded.

Polyamide resins of the present invention can be combined with resins other than the polyamide resins of the present invention to form resin compositions so far as the benefits of the present invention are not affected. Specific examples include polyamide resins other than polyamide resins of the present invention, polyester resins, polycarbonate resins, polyphenylene ether resins, polyacetal resins, polyimide resins, polyurethane resins, acrylic resins, polyacrylonitrile, ionomers, ethylene-vinyl acetate copolymers, fluorine resins, vinyl alcohol copolymers such as ethylene-vinyl alcohol, biodegradable resins and the like, and they can be used alone or as a mixture of two or more of them.

Further, polyamide resins of the present invention can be combined with various additives as appropriate to form resin compositions so far as the object of the present invention is not affected. Specifically, organic stabilizers such as phosphorus stabilizers, hindered phenol stabilizers, hindered amine stabilizers, organic sulfur stabilizers, oxanilide stabilizers and secondary aromatic amine stabilizers; inorganic stabilizers such as copper compounds and halides; inorganic fillers such as glass fillers (glass fibers, milled glass fibers (milled fibers), glass flakes, glass beads, etc.), calcium silicate fillers (wollastonite, etc.), mica, talc, kaolin, potassium titanate whiskers, boron nitride and carbon fibers; crystal nucleating agents such as talc and boron nitride; hydrolysis resistance improving materials such as carbodiimide compounds; conductive agents; lubricants; plasticizers; release agents; pigments; dyes; dispersing agents; antistatic agents; UV absorbers; shock resistance improvers; flame retardants; and other well-known additives can be added, for example.

Polyamide resins of the present invention can be formed into molded articles in various shapes by previously known molding processes. Examples of molding processes include, for example, injection molding, blow molding, extrusion molding, compression molding, vacuum molding, press molding, direct blow molding, rotational molding, sandwich molding and two-color molding.

Known molding processes such as injection molding, blow molding, extrusion molding, compression molding, stretch blow molding and vacuum molding can be applied to polyamide resins of the present invention. They can be molded as engineering plastics into not only molded blocks but also other shapes such as films, sheets, hoses, hollow containers, fibers and tubes so that they can be suitably used for industrial resources, industrial materials, domestic goods, etc.

EXAMPLES

The following examples and comparative examples further illustrate the present invention, but the present invention should not be construed as being limited to these examples.

Analyses for evaluation in the present invention were performed by the following methods.

(1) Sulfur Atom Concentration (Expressed in ppm)

Sebacic acid or a polyamide resin was compressed into tablets through a press and subjected to X-ray fluorescence (XRF) analysis. The XRF analyzer used was the X-ray fluorescence spectrometer ZSX Primus available from Rigaku Corporation equipped with an Rh tube (4 kw). A PP film was used as a film for analyzer window and EZ scan measurements were performed in a vacuum atmosphere. Irradiated areas are 30 mm $\phi$.

(2) Sodium Atom Concentration and Phosphorus Atom Concentration (Expressed in ppm)

The concentration of sodium atoms and the concentration of phosphorus atoms contained in sebacic acids and polyamide resins were assayed by using an atomic absorption spectrometer (available from SHIMADZU Corporation under the brand name AA-6650) and an ICP emission spectrometer (available from SHIMADZU Corporation under the brand name ICPE-9000) after the sebacic acid or polyamide resins were degraded by microwave in nitric acid.

(3) 1,10-Decamethylenedicarboxylic Acid (Abbreviated as "DMDC") Content (Expressed in % by Mass)

DMDC in sebacic acid was qualitatively/quantitatively analyzed by GC/MS after derivatization (to methyl esters). A specific procedure is as follows:

(a) Weigh 8 mg of sebacic acid into a 1 ml Reacti-vial.
(b) Add 0.5 ml of a solution of boron trifluoride-methanol complex in methanol (for GC Assay: 14 to 15% available from Wako Pure Chemical Industries) and put a cap on the vial.
(c) Heat the vial in a block bath controlled at 100° C. for 1 hr, then allow it to cool to room temperature.
(d) Transfer the reaction solution to a 5 ml Reacti-vial, and add 1 ml of chloroform (for atomic absorption spectroscopy available from JUNSEI Chemical Co.) and 2 ml of pure water.
(e) Shake the vial for 5 min, then allow it to stand for 30 min.
(f) Collect organic layers (lower layers) by a syringe and repeat steps (d) and (e).
(g) Collect organic layers (lower layers) by a syringe and subject them to GC/MS analysis.
(h) Qualitatively analyze components from MS spectra and calculate DMDC content (% by mass) from the TIC peak areas.

Conditions for GC/MS analysis are as follows:
GC equipment: 6890N from Agilent
MS equipment: 5975 inert MDS from Agilent
Column: CP-Sil 8CB for amines, 30 m×0.25 mm $\phi$×0.25 pmt
Carrier gas: helium 1 ml/min
Oven temperature: hold at 80° C. for 5 min, then raise at 10° C./min to 300° C. and hold at 300° C. for 13 min.
Injection Split (50:1), inlet temperature 300° C., 1 μl
Interface temperature 300° C.
Ion source temperature 250° C.
Q Pole temperature 150° C.
Mass Range (m/z) 40 to 800
Ionization Energy EI 70 eV (4) Melting Point (Tm) and Glass Transition Point (Tg) of Polyamide Resins The melting point (Tm) was determined by differential scanning calorimetry (DSC) using DSC-60 available from SHIMADZU CORPORATION) from the temperature at the top of the endothermic peak when a polyamide resin sample was melted by heating from 30° C. to a temperature equal to or higher than an expected melting point at a rate of 10° C./min. The melted sample was cooled on dry ice and then heated to a temperature equal to or higher than the melting point at a rate of 10° C./min to determine the glass transition point (Tg).

(5) Terminal Amino Group Concentration ([NH$_2$])

In 30 ml of a phenol/ethanol (4:1) mixed solution was dissolved 0.3 g of each of the polyamide resins obtained by the methods described below with stirring at 20 to 30° C., and this solution was titrated with 0.01N hydrochloric acid to determine the concentration.

(6) Terminal Carboxyl Group Concentration ([COOH])

In 30 ml of benzyl alcohol was dissolved 0.1 g of each of the polyamide resins obtained by the methods described below at 200° C., and 0.1 ml of a phenol red solution was added in the range of 160° C. to 165° C. This solution was titrated with a titration solution of 0.132 g of KOH in 200 ml of benzyl alcohol (0.01 mol/l expressed as KOH content) to determine the concentration.

(The Ratio of the Terminal Amino Group Concentration to the Terminal Carboxyl Group Concentration ([NH$_2$]/[COOH]))

The ratio was calculated from the terminal amino group concentration and the terminal carboxyl group concentration determined by the methods described above.

(7) Number Average Molecular Weight

The number average molecular weight was calculated by the equation below from the values of the terminal amino group concentration [NH$_2$](μeq/g) and the terminal carboxyl group concentration [COOH](μeq/g) determined by the neutralization titrations described above.

$$\text{Number average molecular weight} = 2 \times 1{,}000{,}000/([\text{COOH}]+[\text{NH}_2]).$$

(8) Reaction Molar Ratio

The reaction molar ratio was determined by the equation below:

$$r=(1-cN-b(C-N))/(1-cC+a(C-N))$$

wherein a: $M_1/2$
b: $M_2/2$
c: 18.015
$M_1$: the molecular weight of the diamine component (g/mol)
$M_2$: the molecular weight of the dicarboxylic acid component (g/mol)
N: terminal amino group concentration (eq/g)
C: terminal carboxyl group concentration (eq/g).

(Preparation of Sebacic Acids)

According to the method described in "Journal of Oleo Science 7, 133 (1958)", sebacic acids (SA1)-(SA4) having the sulfur contents, sodium contents and DMDC contents described in Table 1 were prepared by alkali fusion of ricinoleic acid in sesame oil extracted from sesame of various origins. The sulfur atom concentrations, sodium atom concentrations and DMDC contents (% by mass) of the sebacic acids (SA1)-(SA4) are shown in Table 1.

Examples 1-7, Comparative example 1

Example 1

A reaction vessel equipped with a stirrer, a partial condenser, a total condenser, a thermometer, a dropping funnel and a nitrogen inlet as well as a strand die was charged with 12,135 g (60 mol) of sebacic acid (SA1), and thoroughly purged with nitrogen and then heated to 170° C. while stirring the inside of the system under a small amount of a nitrogen gas stream.

To this was added dropwise 8,172 g (60 mol) of m-xylylenediamine (MXDA) with stirring and the inside of the system was continuously heated while the condensed water generated was removed outside the system. After completion of the dropwise addition of m-xylylenediamine, melt polymerization reaction was continued for 40 min at an internal temperature of 260° C.

Then, the inside of the system was pressurized with nitrogen, and the polymer was collected from the strand die and pelletized to give about 22 kg of a polyamide resin. The resulting polyamide resin had a melting point of 190° C. and a glass transition point of 60° C.

Characteristics of this sebacic acid and evaluation results of the polyamide resin are described in Table 1.

Example 2

A polyamide resin was synthesized in the same manner as in Example 1 except that 9.3149 g of sodium hypophosphite monohydrate ($NaH_2PO_2.H_2O$) (150 ppm expressed as the phosphorus atom concentration in the polyamide resin) and 4.8301 g of sodium acetate were introduced into the reaction vessel in addition to sebacic acid (SA1). The molar ratio of sodium acetate/sodium hypophosphite monohydrate is 0.67. The resulting polyamide resin had a melting point of 190° C. and a glass transition point of 60° C.

Example 3 and Example 4

Polyamide resins were synthesized in the same manner as in Example 1 and Example 2, respectively, except that the sebacic acid was replaced by SA2 having the characteristics described in Table 1. Evaluation results of these polyamide resins are described in Table 1. The resulting polyamide resins had melting points of 190° C. and 190° C., respectively, and glass transition points of 60° C. and 60° C., respectively.

Example 5

A polyamide resin was synthesized in the same manner as in Example 1 except that the sebacic acid was replaced by SA3 having the characteristics described in Table 1 and that 3.1050 g of sodium hypophosphite monohydrate ($NaH_2PO_2.H_2O$) (50 ppm expressed as the phosphorus atom concentration in the polyamide resin) and 1.6100 g of sodium acetate were used. The resulting polyamide resin had a melting point of 190° C. and a glass transition point of 60° C.

Example 6

A polyamide resin was synthesized in the same manner as in Example 1 except that m-xylylenediamine (MXDA) was replaced by a 6:4 diamine mixture of m-xylylenediamine (MXDA) and p-xylylenediamine (PXDA) and that 12.4198 g of sodium hypophosphite monohydrate ($NaH_2PO_2.H_2O$) (200 ppm expressed as the phosphorus atom concentration in the polyamide resin) and 6.4402 g of sodium acetate were used. The resulting polyamide resin had a melting point of 221° C. and a glass transition point of 64° C.

Example 7

A reaction vessel equipped with a stirrer, a partial condenser, a total condenser, a thermometer, a dropping device and a nitrogen inlet as well as a strand die was charged with precisely weighed 8950 g (44 mol) of sebacic acid (SA1), 13.7401 g of sodium hypophosphite monohydrate (300 ppm expressed as the phosphorus atom concentration in the polyamide resin), and 10.6340 g of sodium acetate. The molar ratio between sodium hypophosphite and sodium acetate is 1.0. The inside of the reaction vessel was thoroughly purged with nitrogen and then pressurized with nitrogen to 0.3 MPa and heated to 160° C. with stirring to homogeneously melt sebacic acid. Then, 6026 g (44 mol) of p-xylylenediamine (PXDA) was added dropwise with stirring over 170 min. During then, the internal temperature was continuously raised to 281° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of p-xylylenediamine, the pressure was lowered at a rate of 0.4 MPa/hr to atmospheric pressure over 60 min. During then, the internal temperature rose to 299° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give about 13 kg of a polyamide resin. The resulting polyamide resin had a melting point of 288° C. and a glass transition point of 75° C.

Comparative Example

A polyamide resin was synthesized in the same manner as in Example 1 except that the sebacic acid was replaced by SA4 having the characteristics described in Table 1. The resulting polyamide resin had a melting point of 190° C. and a glass transition point of 60° C.

Evaluation results of the polyamide resins obtained above are described in Table 1.

The YI value, flexural modulus of elasticity and gas barrier properties were evaluated as follows.

(i) YI value

The polyamide resins obtained were used in the injection molding machine 100T available from FANUC CORPORATION under conditions of a cylinder temperature controlled at the melting point of each polyamide resin plus 30° C. and a die temperature of 80° C. to prepare a plate having a thickness of 3 mm, which was analyzed according to JIS K-7105 using the spectrophotometer model SE2000 available from NIPPON DENSHOKU INDUSTRIES CO., LTD. in reflectance mode.

(ii) Flexural Modulus of Elasticity (Expressed in GPa)

The polyamide resins obtained were used in the injection molding machine 100T available from FANUC CORPORATION under conditions of a cylinder temperature controlled at the melting point of each polyamide resin plus 30° C. and a die temperature of 80° C. to prepare a specimen having a thickness of 3 mm. The specimen obtained was crystallized at 150° C. for 1 hr and the flexural modulus of elasticity (GPa) was determined according to JIS K7171 using Strograph available from Toyo Seiki Kogyo Co., Ltd. at a temperature of 23° C. and a humidity of 50% RH.

(iii) Gas Barrier Properties (Expressed in cc.mm/m$^2$.day.atm)

The polyamide resins obtained were fed to a single screw extruder having a cylinder diameter of 30 mm and equipped with a flat die (PTM-30 available from PLABOR Research Laboratory of Plastics Technology Co., Ltd.). A film-like material was extruded through the flat die under conditions of a cylinder temperature controlled at the melting point of each polyamide resin plus 30° C. and a screw rotating speed of 30 rpm, and solidified on a chilled roll to give a film having a thickness of 100 μm.

The resulting film was used to determine the oxygen transmission rate (cc.mm/m$^2$.day.atm) of the film according to JIS K7126 in an atmosphere of 23° C., 75% RH using OX-TRAN 2/21 available from Modern Controls, Inc. Lower values show better gas barrier properties.

Examples 8-14, Comparative examples 2-3

[Preparation of Sebacic Acids]

According to the method described in "Journal of Oleo Science 7, 133 (1958)", sebacic acids (SA11)-(SA13) having the sulfur contents, sodium contents and DMDC contents described in Table 2 were prepared by alkali fusion of ricinoleic acid in sesame oil extracted from sesame of various origins.

The sebacic acid TA grade available from Itoh Oil Chemicals Co., Ltd. was used as sebacic acid derived from sesame oil (SA14). Further, sebacic acid derived from a synthetic oil component (adipic acid) (SA15) was prepared according to the method described in JPB S57-60327.

The sulfur atom concentrations, sodium atom concentrations and DMDC contents of the sebacic acids (SA11)-(SA15) are shown in Table 2.

Example 8

A reaction vessel equipped with a stirrer, a partial condenser, a total condenser, a thermometer, a dropping funnel and a nitrogen inlet as well as a strand die was charged with 12,135 g (60.00 mol) of sebacic acid (SA11), and thoroughly purged with nitrogen and then heated to 170° C. while stirring the inside of the system under a small amount of a nitrogen gas stream.

To this was added dropwise 8,413.8 g (60.00 mol) of 1,4-bis(aminomethyl)cyclohexane (hereinafter sometimes referred to as "14BAC"; cis/trans molar ratio: 20/80) available from Mitsubishi Gas Chemical Company, Inc. with stirring and the inside of the system was continuously heated while the condensed water generated was removed outside the system. After completion of the dropwise addition of 1,4-bis(aminomethyl)cyclohexane, melt polymerization reaction was continued for 40 min at an internal temperature of 300° C.

Then, the inside of the system was pressurized with nitrogen, and the polymer was collected from the strand die and pelletized to give about 22 kg of a polyamide resin. The resulting polyamide resin had a melting point of 288° C. and a glass transition point of 89° C.

TABLE 1

| | Examples | | | | | | | Comparative |
|---|---|---|---|---|---|---|---|---|
| | 1 | 2 | 3 | 4 | 5 | 6 | 7 | example 1 |
| Diamine | MXDA | MXDA | MXDA | MXDA | MXDA | MXDA/PXDA | PXDA | MXDA |
| Sebacic acid | SA1 | SA1 | SA2 | SA2 | SA3 | SA1 | SA1 | SA4 |
| S content (ppm) | 30 | 30 | 4 | 4 | 100 | 30 | 30 | 0 |
| Na content (ppm) | 54 | 54 | 1 | 1 | 120 | 54 | 54 | 0 |
| DMDC (% by mass) | 0.49 | 0.49 | 0.18 | 0.18 | 0.54 | 0.49 | 0.49 | 0 |
| Polyamide resin | | | | | | | | |
| P content (ppm) | 0 | 150 | 0 | 150 | 50 | 200 | 300 | 0 |
| S content (ppm) | 14 | 14 | 2 | 2 | 50 | 15 | 15 | 0 |
| Na content (ppm) | 41 | 214 | 0 | 188 | 122 | 274 | 473 | 0 |
| Number average molecular weight | 13500 | 16000 | 14000 | 16800 | 17000 | 20000 | 18800 | 14500 |
| Melting point (° C.) | 190 | 190 | 190 | 190 | 190 | 211 | 288 | 190 |
| Glass transition temperature (° C.) | 60 | 60 | 60 | 60 | 60 | 64 | 75 | 60 |
| Yellow index (YI) | 1.7 | −1.0 | 3.0 | 0.6 | −3.0 | −2.0 | −3.0 | 10 |
| Flexural modulus of elasticity (MPa) | 3.2 | 3.2 | 3.2 | 3.2 | 3.2 | 3.1 | 2.9 | 3.1 |
| Gas barrier properties (cc · mm/m$^2$ · day · atm) | 0.8 | 0.8 | 0.8 | 0.8 | 0.8 | 0.9 | 1.0 | 0.8 |

Example 9

A polyamide resin was synthesized in the same manner as in Example 8 except that 9.439 g of sodium hypophosphite monohydrate (NaH$_2$PO$_2$.H$_2$O) (150 ppm by mass expressed as the phosphorus atom concentration in the polyamide resin) and 4.8945 g of sodium acetate were introduced into the reaction vessel in addition to sebacic acid (SA11). The molar ratio of sodium acetate/sodium hypophosphite monohydrate is 0.67. The resulting polyamide resin had a melting point of 288° C. and a glass transition point of 89° C.

Example 10 and Example 11

Polyamide resins were synthesized in the same manner as in Example 8 as for Example 10 and in the same manner as in Example 9 as for Example 11 except that the sebacic acid was replaced by SA12 having the characteristics described in Table 2 and that the cis/trans molar ratio of 1,4-bis(aminomethyl)cyclohexane was changed. Evaluation results of these polyamide resins are described in Table 2. The resulting polyamide resins had melting points of 296° C. and 261° C., respectively, and glass transition points of 91° C. and 90° C., respectively.

Example 12

A polyamide resin was synthesized in the same manner as in Example 8 except that the sebacic acid was replaced by SA13 having the characteristics described in Table 2 and that 3.1463 g of sodium hypophosphite monohydrate (NaH$_2$PO$_2$.H$_2$O) (50 ppm by mass expressed as the phosphorus atom concentration in the polyamide resin) and 1.6351 g of sodium acetate were used. The resulting polyamide resin had a melting point of 288° C. and a glass transition point of 89° C.

Example 13

A polyamide resin was synthesized in the same manner as in Example 8 except that 1,4-bis(aminomethyl)cyclohexane was replaced by a 95:5 diamine mixture of cis- and trans-isomers and that 12.5853 g of sodium hypophosphite monohydrate (NaH$_2$PO$_2$.H$_2$O) (200 ppm by mass expressed as the phosphorus atom concentration in the polyamide resin) and 6.526 g of sodium acetate were used. The resulting polyamide resin had a melting point of 207° C. and a glass transition point of 87° C.

Example 14

A reaction vessel equipped with a stirrer, a partial condenser, a total condenser, a thermometer, a dropping device and a nitrogen inlet as well as a strand die was charged with precisely weighed 8950 g (44.25 mol) of sebacic acid (SA11), 13.9232 g of sodium hypophosphite monohydrate (300 ppm by mass expressed as the phosphorus atom concentration in the polyamide resin), and 10.7757 g of sodium acetate. The molar ratio between sodium hypophosphite and sodium acetate is 1.0. The inside of the reaction vessel was thoroughly purged with nitrogen and then pressurized with nitrogen to 0.3 MPa and heated to 160° C. with stirring to homogeneously melt sebacic acid. Then, 6174.5 g (44.03 mol) of 1,4-bis(aminomethyl)cyclohexane was added dropwise with stirring over 170 min. During then, the internal temperature was continuously raised to 291° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of 1,4-bis(aminomethyl)cyclohexane, the pressure was lowered at a rate of 0.4 MPa/hr to atmospheric pressure over 60 min. During then, the internal temperature rose to 300° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give about 13 kg of a polyamide resin. The resulting polyamide resin had a melting point of 288° C. and a glass transition point of 89° C.

Comparative Examples 2-3

Polyamide resins were synthesized in the same manner as in Example 8 except that the sebacic acid was replaced by SA14 and SA15 having the characteristics described in Table 2. The resulting polyamide resins both had a melting point of 288° C. and a glass transition point of 89° C.

Evaluation results of the polyamide resins obtained above are described in Table 2.

The YI value, flexural modulus of elasticity and tensile strength retention were evaluated as follows.

(i) YI value

The polyamide resins obtained were dried under vacuum at 150° C. for 5 hrs and then processed in the injection molding machine 100T available from FANUC CORPORATION under conditions of a cylinder temperature controlled at the melting point of each polyamide resin plus 25° C. and a die temperature of 30° C. to prepare a plate having a thickness of 3 mm, which was analyzed according to JIS K-7105 using the spectrophotometer model SE2000 available from NIPPON DENSHOKU INDUSTRIES CO., LTD. in reflectance mode.

(ii) Flexural Modulus of Elasticity (Expressed in GPa)

The polyamide resins obtained were dried under vacuum at 150° C. for 5 hrs and then processed in the injection molding machine 100T available from FANUC CORPORATION under conditions of a cylinder temperature controlled at the melting point of each polyamide resin plus 25° C. and a die temperature of 30° C. to prepare a specimen having a thickness of 3 mm. The specimen obtained was crystallized at 150° C. for 1 hr and the flexural modulus of elasticity (GPa) was determined according to JIS K7171 using Strograph available from Toyo Seiki Kogyo Co., Ltd. at a temperature of 23° C. and a humidity of 50% RH.

(iii) Heat Aging Resistance Test (Tensile Strength Retention)

The polyamide resins obtained were dried under vacuum at 150° C. for 5 hrs and then processed in the injection molding machine "SE50" available from Sumitomo Heavy Industries, Ltd. under conditions of a cylinder temperature controlled at the melting point of each polyamide resin plus 25° C. and a die temperature of 30° C. to prepare a specimen (ISO specimen having a thickness of 4 mm).

The resulting specimen was stored in the atmosphere at 150° C. and its tensile strength (MPa) was determined according to JIS K7113. Tensile strength after storage at 150° C. for 24 hrs was divided by tensile strength after storage at 150° C. for 1 hr to determine tensile strength retention (%).

TABLE 2

|  | Examples | | | | | | | Comparative examples | |
| --- | --- | --- | --- | --- | --- | --- | --- | --- | --- |
|  | 8 | 9 | 10 | 11 | 12 | 13 | 14 | 2 | 3 |
| Diamine | 14BAC | 14BAC | 14BAC | 14BAC | 14BAC | 14BAC | 14BAC | 14BAC | 14BAC |
| cis/trans molar ratio | 20/80 | 20/80 | 0/100 | 40/60 | 20/80 | 95/5 | 20/80 | 20/80 | 20/80 |
| Sebacic acid | SA11 | SA11 | SA12 | SA12 | SA13 | SA11 | SA11 | SA14 | SA15 |
| S content (ppm) | 30 | 30 | 4 | 4 | 100 | 30 | 30 | 0 | 0 |
| Na content (ppm) | 54 | 54 | 1 | 1 | 120 | 54 | 54 | 0 | 0 |
| DMDC (% by mass) | 0.49 | 0.49 | 0.18 | 0.18 | 0.54 | 0.49 | 0.49 | 0 | 0 |
| Polyamide resin | | | | | | | | | |
| P content (ppm) | 0 | 150 | 0 | 150 | 50 | 200 | 300 | 0 | 0 |
| S content (ppm) | 14 | 14 | 2 | 2 | 50 | 15 | 15 | 0 | 0 |
| Na content (ppm) | 41 | 214 | 0 | 188 | 122 | 274 | 473 | 0 | 0 |
| [$NH_2$] (μeq/g) | 50 | 51 | 45 | 48 | 49 | 46 | 40 | 53 | 42 |
| [COOH] (μeq/g) | 60 | 60 | 50 | 57 | 52 | 63 | 45 | 58 | 56 |
| Number average molecular weight | 18182 | 18868 | 21053 | 19048 | 19802 | 18349 | 23529 | 18018 | 20408 |
| Melting point (° C.) | 288 | 288 | 296 | 261 | 288 | 207 | 288 | 288 | 288 |
| Glass transition temperature (° C.) | 89 | 89 | 91 | 90 | 89 | 87 | 89 | 89 | 89 |
| Reaction molar ratio (r) | 0.9985 | 0.9994 | 0.9992 | 0.9986 | 0.9995 | 0.9974 | 0.9992 | 0.9992 | 0.9979 |
| Yellow index (YI) | 1.8 | −1.1 | 3.1 | 0.7 | −3.3 | −2.2 | −3 | 11 | 13 |
| Flexural modulus of elasticity (GPa) | 3.2 | 3.2 | 3.2 | 3.2 | 3.2 | 3.1 | 2.9 | 3.1 | 3.1 |
| Tensile strength retention (%) | 83 | 88 | 78 | 86 | 90 | 94 | 96 | 74 | 73 |

Examples 15-21, Comparative examples 4-5

Example 15

A reaction vessel equipped with a stirrer, a partial condenser, a total condenser, a thermometer, a dropping funnel and a nitrogen inlet as well as a strand die was charged with 12,135 g (60.00 mol) of sebacic acid (SA11), and thoroughly purged with nitrogen and then heated to 170° C. while stirring the inside of the system under a small amount of a nitrogen gas stream.

To this was added dropwise 8,413.8 g (60.00 mol) of 1,3-bis(aminomethyl)cyclohexane (BAC; cis/trans molar ratio: 74/26) available from Mitsubishi Gas Chemical Company, Inc. with stirring and the inside of the system was continuously heated while the condensed water generated was removed outside the system. After completion of the dropwise addition of 1,3-bis(aminomethyl)cyclohexane, melt polymerization reaction was continued for 40 min at an internal temperature of 240° C. Then, the inside of the system was pressurized with nitrogen, and the polymer was collected from the strand die and pelletized to give about 22 kg of a polyamide resin. The resulting polyamide resin had a melting point of 189° C. and a glass transition point of 84.5° C.

Example 16

A polyamide resin was synthesized in the same manner as in Example 1 except that 9.439 g of sodium hypophosphite monohydrate ($NaH_2PO_2.H_2O$) (150 ppm by mass expressed as the phosphorus atom concentration in the polyamide resin) and 4.8945 g of sodium acetate were introduced into the reaction vessel in addition to sebacic acid (SA11). The molar ratio of sodium acetate/sodium hypophosphite monohydrate is 0.67. The resulting polyamide resin had a melting point of 189° C. and a glass transition point of 84.5° C.

Example 17 and Example 18

Polyamide resins were synthesized in the same manner as in Example 15 as for Example 17 and in the same manner as in Example 15 as for Example 17 except that the sebacic acid was replaced by SA12 having the characteristics described in Table 3 and that the cis/trans molar ratio of 1,3-bis(aminomethyl)cyclohexane was changed. Evaluation results of these polyamide resins are described in Table 3. The resulting polyamide resins had melting points of 204° C. and 204° C., respectively, and glass transition points of 86° C. and 86° C., respectively.

Example 19

A polyamide resin was synthesized in the same manner as in Example 15 except that the sebacic acid was replaced by SA13 having the characteristics described in Table 3 and that 3.1463 g of sodium hypophosphite monohydrate ($NaH_2PO_2.H_2O$) (50 ppm by mass expressed as the phosphorus atom concentration in the polyamide resin) and 1.6351 g of sodium acetate were used. The resulting polyamide resin had a melting point of 189° C. and a glass transition point of 84.5° C.

Example 20

A polyamide resin was synthesized in the same manner as in Example 15 except that 1,3-bis(aminomethyl)cyclohexane was replaced by a 96:4 diamine mixture of cis- and trans-isomers and that 12.5853 g of sodium hypophosphite monohydrate ($NaH_2PO_2.H_2O$) (200 ppm by mass expressed as the phosphorus atom concentration in the polyamide resin) and 6.526 g of sodium acetate were used. The resulting polyamide resin had a melting point of 209° C. and a glass transition point of 88° C.

Example 21

A reaction vessel equipped with a stirrer, a partial condenser, a total condenser, a thermometer, a dropping device and a nitrogen inlet as well as a strand die was charged with precisely weighed 8950 g (44.25 mol) of sebacic acid (SA11), 13.9232 g of sodium hypophosphite monohydrate (300 ppm by mass expressed as the phosphorus atom concentration in the polyamide resin), and 10.7757 g of sodium acetate. The molar ratio between sodium hypophosphite and sodium acetate is 1.0. The inside of the reaction vessel was thoroughly purged with nitrogen and then pressurized with nitrogen to 0.3 MPa and heated to 160° C. with stirring to homo-

Comparative Examples 4 and 5

Polyamide resins were synthesized in the same manner as in Example 15 except that the sebacic acid was replaced by SA14 and SA15 having the characteristics described in Table 3. The resulting polyamide resins both had a melting point of 189° C. and a glass transition point of 84.5° C.

The YI values, flexural moduli of elasticity and tensile strength retentions of the polyamide resins obtained above were evaluated in the same manner as in Examples 8-14. Evaluation results are described in Table 3.

TABLE 3

|  | Examples | | | | | | | Comparative examples | |
|---|---|---|---|---|---|---|---|---|---|
|  | 15 | 16 | 17 | 18 | 19 | 20 | 21 | 4 | 5 |
| Diamine | 13BAC | 13BAC | 13BAC | 13BAC | 13BAC | 13BAC | 13BAC | 13BAC | 13BAC |
| cis/trans molar ratio | 74/26 | 74/26 | 90/10 | 90/10 | 74/26 | 96/4 | 74/26 | 74/26 | 74/26 |
| Sebacic acid | SA11 | SA11 | SA12 | SA12 | SA13 | SA11 | SA11 | SA14 | SA15 |
| S content (ppm) | 30 | 30 | 4 | 4 | 100 | 30 | 30 | 0 | 0 |
| Na content (ppm) | 54 | 54 | 1 | 1 | 120 | 54 | 54 | 0 | 0 |
| DMDC (% by mass) | 0.49 | 0.49 | 0.18 | 0.18 | 0.54 | 0.49 | 0.49 | 0 | 0 |
| Polyamide resin |  |  |  |  |  |  |  |  |  |
| P content (ppm) | 0 | 150 | 0 | 150 | 50 | 200 | 300 | 0 | 0 |
| S content (ppm) | 14 | 14 | 2 | 2 | 50 | 15 | 15 | 0 | 0 |
| Na content (ppm) | 41 | 214 | 0 | 188 | 122 | 274 | 473 | 0 | 0 |
| [$NH_2$] (µeq/g) | 49 | 50 | 46 | 49 | 47 | 46 | 39 | 52 | 43 |
| [COOH] (µeq/g) | 59 | 60 | 51 | 56 | 52 | 62 | 44 | 58 | 55 |
| Number average molecular weight | 18182 | 18868 | 21053 | 19048 | 19802 | 18349 | 23529 | 18018 | 20408 |
| Melting point (° C.) | 189 | 189 | 204 | 204 | 189 | 209 | 189 | 189 | 189 |
| Glass transition temperature (° C.) | 84.5 | 84.5 | 86 | 86 | 84.5 | 88 | 84.5 | 84.5 | 84.5 |
| Reaction molar ratio (r) | 0.9985 | 0.9994 | 0.9992 | 0.9989 | 0.9992 | 0.9975 | 0.9992 | 0.9991 | 0.9982 |
| Yellow index (YI) | 1.7 | −1.0 | 3.0 | 0.6 | −3.0 | −2.0 | −3.0 | 10 | 11 |
| Flexural modulus of elasticity (GPa) | 3.0 | 3.0 | 3.1 | 3.1 | 3.0 | 3.2 | 3.0 | 3.0 | 3.0 |
| Tensile strength retention (%) | 82 | 88 | 79 | 85 | 90 | 93 | 95 | 75 | 75 | geneously melt sebacic acid. Then, 6174.5 g (44.03 mol) of 1,3-bis(aminomethyl)cyclohexane was added dropwise with stirring over 170 min. During then, the internal temperature was continuously raised to 235° C. During the dropwise addition step, the pressure was controlled at 0.5 MPa and the water generated was removed outside the system through the partial condenser and the total condenser. The temperature in the partial condenser was controlled in the range of 145 to 147° C. After completion of the dropwise addition of 1,3-bis (aminomethyl)cyclohexane, the pressure was lowered at a rate of 0.4 MPa/hr to atmospheric pressure over 60 min. During then, the internal temperature rose to 240° C. Then, the pressure was lowered at a rate of 0.002 MPa/min to 0.08 MPa over 20 min. Then, the reaction was continued at 0.08 MPa until the torque of the stirrer reached a predetermined value. The reaction period at 0.08 MPa was 10 min. Then, the inside of the system was pressurized with nitrogen, and the polymer was collected from the strand die and pelletized to give about 13 kg of a polyamide resin. The resulting polyamide resin had a melting point of 189° C. and a glass transition point of 84.5° C.

Examples 22-23

Example 22

A reaction vessel equipped with a stirrer, a partial condenser, a total condenser, a thermometer, a dropping funnel and a nitrogen inlet as well as a strand die was charged with 12,135 g (60.00 mol) of sebacic acid (SA11), and thoroughly purged with nitrogen and then heated to 170° C. while stirring the inside of the system under a small amount of a nitrogen gas stream.

To this was added dropwise 8,413.8 g (60.00 mol) of a BAC mixture composed of 1,3-bis(aminomethyl)cyclohexane (BAC; cis/trans molar ratio: 70/30) and 1,4-bis(aminomethyl)cyclohexane (BAC; cis/trans molar ratio: 15/85) (1,3-BAC/1,4-BAC mixture ratio: 70/30) available from Mitsubishi Gas Chemical Company, Inc. with stirring and the inside of the system was continuously heated while the condensed water generated was removed outside the system. After completion of the dropwise addition of the mixed bis(aminomethyl)cyclohexane, melt polymerization reaction was continued for 40 min at an internal temperature of 240° C. Then, the inside of the system was pressurized with nitrogen, and the polymer was collected from the strand die and pelletized to give about 22 kg of a polyamide resin. The resulting polyamide resin had a melting point of 191° C. and a glass transition point of 71° C. DSC analysis showed no crystallization peak upon temperature drop, confirming that the polyamide is nearly amorphous.

Example 23

A polyamide resin was synthesized in the same manner as in Example 22 except that a BAC mixture composed of 1,3-bis(aminomethyl)cyclohexane (BAC; cis/trans molar ratio: 70/30) and 1,4-bis(aminomethyl)cyclohexane (BAC; cis/trans molar ratio: 15/85) (1,3-BAC/1,4-BAC mixture ratio: 30/70) available from Mitsubishi Gas Chemical Company, Inc. was used and that the internal temperature after completion of the dropwise addition was 270° C. The resulting polyamide resin had a melting point of 255° C. and a glass transition point of 92° C.

The YI values, flexural moduli of elasticity and tensile strength retentions of the polyamide resins obtained above were evaluated in the same manner as in Examples 8-14. Evaluation results are described in Table 4.

TABLE 4

|  | Examples | |
| --- | --- | --- |
|  | 22 | 23 |
| Diamine | 13BAC/14BAC | 13BAC/14BAC |
| 13/14 molar ratio | 70/30 | 30/70 |
| Sebacic acid | SA11 | SA11 |
| S content (ppm) | 30 | 30 |
| Na content (ppm) | 54 | 54 |
| DMDC (% by mass) | 0.49 | 0.49 |
| Polyamide resin |  |  |
| P content (ppm) | 0 | 0 |
| S content (ppm) | 14 | 14 |
| Na content (ppm) | 41 | 41 |
| [NH$_2$] (µeq/g) | 48 | 49 |
| [COOH] (µeq/g) | 58 | 55 |
| Number average molecular weight | 18868 | 19231 |
| Melting point (° C.) | 191 | 255 |
| Glass transition temperature (° C.) | 71 | 92 |
| Reaction molar ratio (r) | 0.9985 | 0.9991 |
| Yellow index (YI) | 2.0 | 1.8 |
| Flexural modulus of elasticity (GPa) | 3.0 | 3.0 |
| Tensile strength retention (%) | 83 | 85 |

Industrial Applicability

Polyamide resins of the present invention have excellent color tone and elastic modulus as well as excellent gas barrier properties and low water absorption so that they can be widely used for various applications and can be suitably used for a wide variety of moldings including various films, sheets, laminated films, laminated sheets, tubes, hoses, pipes, various containers such as hollow containers and bottles, various parts and the like, and therefore, they will find very wide industrial applicability.

The invention claimed is:
1. A polyamide resin material comprising:
a diamine structural unit; and
a dicarboxylic acid structural unit,
wherein 70 mol % or more of the diamine structural unit is derived from at least one of xylylenediamine, 1,3-bis (aminomethyl)cyclohexane, and 1,4-bis(aminomethyl) cyclohexane, 50 mol % or more of the dicarboxylic acid structural unit is derived from sebacic acid a sulfur atom concentration is 1 to 200 ppm by mass, a sodium atom concentration is 1 to 500 ppm by mass, a phosphorus atom concentration is 1 to 500 ppm by mass, and the polyamide resin material is free from a reducing sulfur-containing compound.

2. The polyamide resin material according to claim 1, wherein the xylylenediamine is m-xylylenediamine, p-xylylenediamine or a mixture thereof.

3. The polyamide resin material according to claim 1, wherein 60 to 100 mole % of the dicarboxylic acid structural unit is derived from the sebacic acid.

4. The polyamide resin material according to claim 1, which has a number average molecular weight of 10,000 to 50,000.

5. The polyamide resin material according to claim 1, wherein a reaction molar ratio, r, of the diamine component to the dicarboxylic acid component represented by equation (1) is 0.98 to 1.1;

$$r = (1 - cN - b(C-N))/(1 - cC + a(C-N)) \tag{1}$$

wherein $a = M_1/2$, $b = M_2/2$, $c = 18.015$, wherein $M_1$ represents a molecular weight in g/mol of the diamine component, $M_2$ represents a molecular weight in g/mol of the dicarboxylic acid component, N represents a terminal amino group concentration in eq/g, and C represents a terminal carboxyl group concentration in eq/g.

6. A molded article formed by molding the polyamide resin material according to any one of claims 1, 2 and 3-5.

7. The polyamide resin material according to claim 1, wherein 70 to 100 mole % of the dicarboxylic acid structural unit is derived from the sebacic acid.

8. The polyamide resin material according to claim 1, wherein the sulfur atom concentration is 10 to 150 ppm by mass.

9. The polyamide resin material according to claim 1, wherein the sulfur atom concentration is 20 to 100 ppm by mass.

10. The polyamide resin material according to claim 1, wherein the phosphorus atom concentration is 5 to 300 ppm by mass.

11. The polyamide resin material according to claim 1, wherein the phosphorus atom concentration is 10 to 200 ppm by mass.

12. The polyamide resin material according to claim 1, wherein the sebacic acid comprises 0.18 to 1% by mass of 1,10-decamethylenedicarboxilic acid.

13. The polyamide resin material according to claim 1, wherein the sebacic acid has a Hue of 100 or less, the Hue being determined by Standard Methods for the Analysis of Fats, Oils and Related Materials provided by Japan Oil Chemists' Society.

14. The polyamide resin material according to claim 1, wherein when the polyamide resins are processed in an injection molding machine under conditions of a cylinder temperature controlled at a melting point of the polyamide resin plus 25° C. and a die temperature of 30° C. to obtain a plate having a thickness of 3 mm, the obtained plate has YI value of 3.1 or less.

15. The polyamide resin material according to claim 1, wherein a ratio of the phosphorus atom concentration to the sodium atom concentration in the polyamide resin material is from 0.4 to 0.9.

* * * * *